(12) United States Patent
Ooba

(10) Patent No.: US 6,717,929 B1
(45) Date of Patent: Apr. 6, 2004

(54) MULTI-ANTENNA RADIO APPARATUS WITH SIMPLIFIED CIRCUIT STRUCTURE

(75) Inventor: Hiroaki Ooba, Saitama (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/400,290

(22) Filed: Sep. 21, 1999

(30) Foreign Application Priority Data

Sep. 25, 1998 (JP) .......................................... 10-271781

(51) Int. Cl.$^7$ ............................................. H04B 7/216
(52) U.S. Cl. ..................... 370/335; 455/562.1; 375/144; 375/145; 375/148; 375/149; 370/341; 370/342
(58) Field of Search ........................ 370/335, 341–342, 370/310; 375/130, 131, 135, 136, 144, 145, 148, 149; 455/562.1

(56) References Cited

U.S. PATENT DOCUMENTS

| | | | |
|---|---|---|---|
| 5,511,068 A | * | 4/1996 | Sato ............................ 370/335 |
| 5,544,167 A | * | 8/1996 | Lucas et al. ................. 370/342 |
| 5,809,020 A | * | 9/1998 | Bruckert et al. ............. 370/335 |
| 6,069,884 A | * | 5/2000 | Hayashi et al. ............. 370/335 |

FOREIGN PATENT DOCUMENTS

| | | | |
|---|---|---|---|
| JP | 3-282278 | 12/1991 | |
| JP | 4-37340 | 2/1992 | |
| JP | 8-331011 | 12/1996 | |
| JP | 08-331011 | * 12/1996 | ........... H04B/1/707 |
| JP | 9-64784 | 3/1997 | |
| JP | 9-74372 | 3/1997 | |

* cited by examiner

*Primary Examiner*—William Trost
*Assistant Examiner*—Sharad Rampuria
(74) *Attorney, Agent, or Firm*—Whitham, Curtis & Christofferson, P.C.

(57) ABSTRACT

A radio apparatus includes a plurality of antennas, a plurality of spreading sections, a synthesizing section a converting section, a plurality of inverse spreading sections and a control unit. The plurality of antennas are provided at different physical positions to receive a radio wave signal, respectively. The plurality of spreading sections are provided for the plurality of antennas to spread the radio wave signal received by the plurality of antennas with spreading codes provided for the plurality of antennas to produce spread signals, respectively. The synthesizing section synthesizes the spread signals into an analog synthetic signal. The converting section converts the analog synthetic signal into a digital signal with a frequency such that a digital process can be applied to the digital signal. The plurality of inverse spreading sections are provided for the plurality of antennas to inversely spread the digital signal with inverse spreading codes provided for the plurality of antennas to produce inversely spread signals. The control unit controls orientation of the plurality of antennas based on the inversely spread signals.

18 Claims, 6 Drawing Sheets

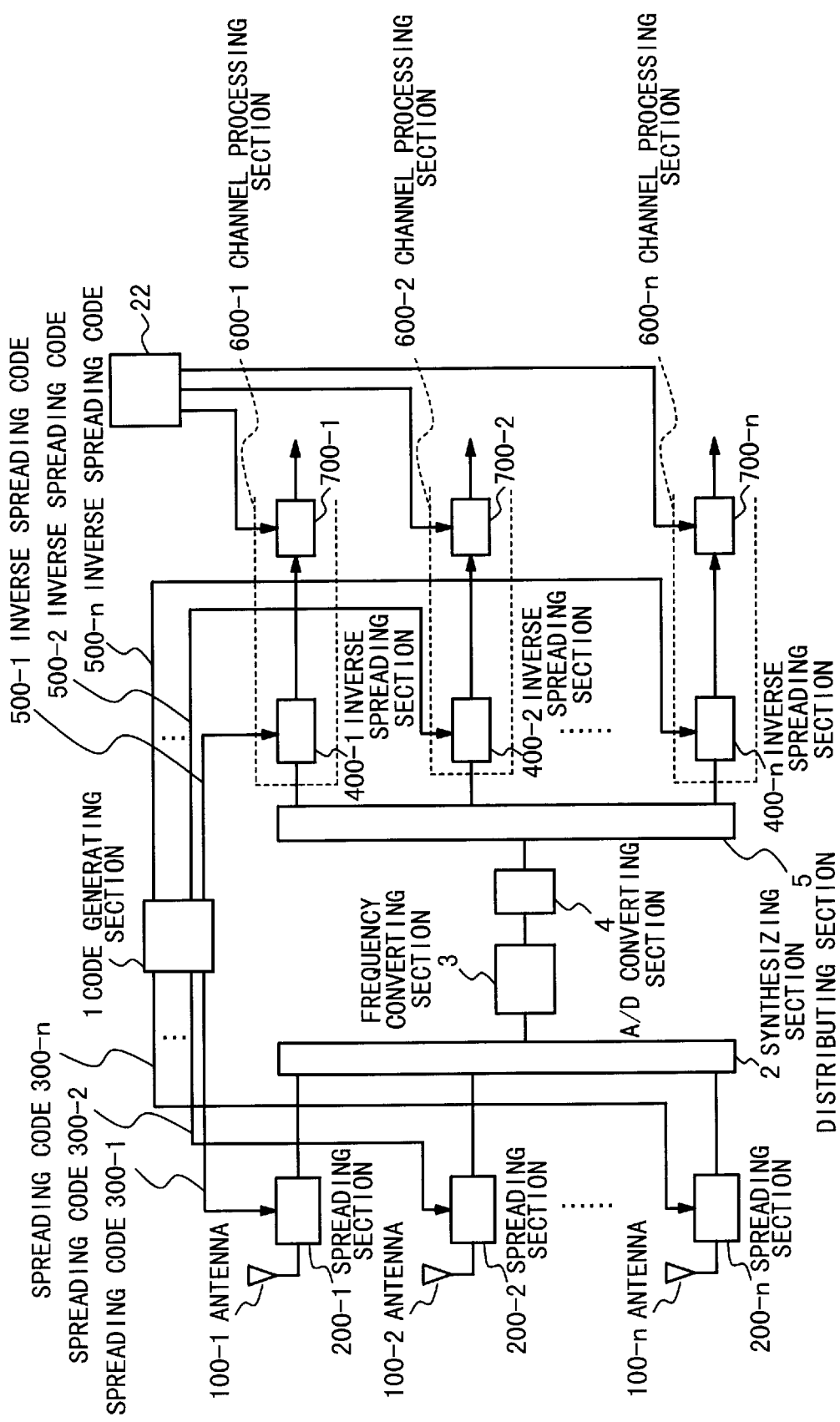

MULTI-ANTENNA RADIO APPARATUS WITH SIMPLIFIED CIRCUIT STRUCTURE

BACKGROUND OF THE INVENTION

1. Field of the Invention

The present invention relates to a radio apparatus using a plurality of antennas, and more particularly to a multi-antenna radio apparatus with a simplified circuit structure.

2. Description of the Related Art

An adaptive array antenna system has a plurality of antennas, and detects the incident direction of radio wave from the phases of the radio wave received by the plurality of antennas to transmit a radio wave beam to the detected direction. For this purpose, it is necessary to correctly detect the phase difference in the received radio wave between the plurality of antennas.

However, in order to detect the phase difference in the radio wave between the antennas, it is generally necessary to convert the frequency of a radio frequency signal supplied from the respective antennas into a frequency adaptive for digital processing. In this case, frequency-converting sections provided for the antennas are required to perform the frequency conversion. Therefore, the apparatus became large in scale.

Also, when there is a phase drift in a local oscillation signal of each frequency converting section in the frequency conversion, the phase relation in the respective antennas is lost. For this reason, it is needed to use a local oscillation signal which is common to the frequency converting sections. In this case, it could be considered that another panel exclusive for the local oscillation signal is provided. However, because the local oscillation signal is distributed to each antenna, the local oscillation signal of the high precision becomes necessary to compensate for the distribution loss. Therefore, the unnecessary radiation becomes easy to generate. Also, the number of physical wiring lines increases. Thus, the facilities becomes large.

In conjunction with the above description, a receiving system is disclosed in Japanese Laid Open Patent Application (JP-A-Heisei 3-282278). In this reference, outputs from antenna elements of antenna systems are supplied to frequency converters (30, 3E, 3N). An output of a local oscillator (4) is spread in spreading units (50, 5E, 5N) with different codes which are generated by code generators (60, 6E, 6N). The spread signals are supplied to the frequency converters (30, 3E, 3N). Outputs of the frequency converters (30, 3E, 3N) are synthesized by a synthesizer (7) and amplified by an amplifier (8). The amplified signal is inversely spread in inversely spreading units (90, 9E, 9N) with outputs from the code generators (60, 6E, 6N).

Also, a spectrum spreading receiving apparatus is disclosed in Japanese Laid Open Patent Application (JP-A-Heisei 4-37340). In this reference, the spectrum spreading receiving apparatus includes N A/D converters and an adaptive filter for inputting outputs of the A/D converters to remove unnecessary frequency components. The spectrum spreading receiving apparatus is further composed of a reference signal generator, a calculator for calculating a correlation value of an output of the adaptive filter and an output of the reference signal generator, and a synchronization establishing means for establishing synchronization with a reception signal. The spectrum spreading receiving apparatus is further composed of means for dividing a calculation interval for the calculator into sub-intervals, and adding means for adding the correlation value at every sub-interval.

Also, a receiving apparatus is disclosed in Japanese Laid Open Patent Application (JP-A-Heisei 8-331011). In this reference, a summation calculating circuit receives an output of a correlating unit in a spreading communication system mobile station. The summation calculating circuit has a power mode and a quasi-delay detecting mode. Ones higher than a threshold value, of summation values from a plurality of calculating means are selected from the maximum summation value for a predetermined number.

Also, a spectrum spreading transmitting apparatus is disclosed in Japanese Laid Open Patent Application (JP-A-Heisei 9-64784). In this reference, a transmission data is divided into a plurality of data portions to elongate a period between data portions. The data portions are spread using different spreading codes with a long period. After reception, data portions are reproduced and integrated into the transmission data.

Also, a spectrum spreading radio transmitting apparatus is disclosed in Japanese Laid Open Patent Application (JP-A-Heisei 9-74372). In this reference, in the spectrum spreading radio receiving apparatus, a variable gain amplifiers (102-i) adjust amplification of signals received by a plurality of reception branches (101-i). An adder (103) adds the signals outputted from the variable gain amplifiers (102-i) to supply to an inverse spreading unit. A directionality control section (104) controls the amplification of each variable gain amplifier such that influence of a delayed wave having a delay smaller than a chip time width of the spread signal is reduced. Addition of the structure for an adaptive antenna system to control the directionality of the reception antennas to the spectrum spreading radio receiving apparatus with a RAKE receiving function make it possible to reduce the influences of an identical channel interference wave which cannot be measured by the RAKE receiving function and a delayed wave with a delay smaller than the chip time width of the spread signal.

SUMMARY OF THE INVENTION

Therefore, an object of the present invention is to provide a radio apparatus which can be simplified in the structure by use of spreading codes and inverse spreading codes.

Another object of the present invention is to provide a radio apparatus which can detect the incident direction of a radio wave with a simple structure so as to control the directionality of antennas.

Still another object of the present invention is to provide a radio apparatus which can reproduce a spread signal with a simple structure by use of spreading codes and inverse spreading codes while a plurality of antennas are used.

In order to achieve an aspect of the present invention, a radio apparatus includes a plurality of antennas, a plurality of spreading sections, a synthesizing section a converting section, a plurality of inverse spreading sections and a control unit. The plurality of antennas are provided at different physical positions to receive a radio wave signal, respectively. The plurality of spreading sections are provided for the plurality of antennas to spread the radio wave signal received by the plurality of antennas with spreading codes provided for the plurality of antennas to produce spread signals, respectively. The synthesizing section synthesizes the spread signals into an analog synthetic signal. The converting section converts the analog synthetic signal into a digital signal with a frequency such that a digital process can be applied to the digital signal. The plurality of inverse spreading sections are provided for the plurality of antennas to inversely spread the digital signal with inverse spreading codes provided for the plurality of antennas to produce inversely spread signals. The control unit controls orientation of the plurality of antennas based on the inversely spread signals.

The radio apparatus may further include a code generating section generating the spreading codes and the inverse spreading codes.

One of the spreading codes and a corresponding one of the inverse spreading codes have the same pattern and same phase. In this case, the spreading codes are peculiar to the plurality of antennas.

The radio wave signal may be of a TDMA system using a specific spreading code and a specific inverse spreading code. In this case, the spreading codes and the inverse spreading codes may be synchronous with the specific spreading code and the specific inverse spreading code, and have correlation with the specific spreading code and the specific inverse spreading code such that no influence is given to the specific spreading code and the specific inverse spreading code. Instead, the spreading codes and the inverse spreading codes may have a spreading gain such that no influence is given to the specific spreading code and the specific inverse spreading code.

The plurality of antennas preferably receive the radio wave signal to have phase shifts determined based on the physical positions.

In order to achieve another aspect of the present invention, a method of reproducing a digital signal in a radio apparatus, includes:

receiving a carrier signal by a plurality of antennas provided at different physical positions;

spreading the received carrier signals with spreading codes provided for the plurality of antennas;

synthesizing the spread signals into an analog synthetic signal;

converting the analog synthetic signal into a converted signal with a frequency such that a digital process can be applied to the digital signal; and inversely spreading the converted signal with inverse spreading codes provided for the plurality of antennas so that digital signals can be reproduced.

In order to achieve still another aspect of the present invention, a radio apparatus includes a plurality of antennas, a plurality of spreading sections, a synthesizing section, a converting section, a plurality of first inverse spreading sections, and a plurality of second inverse spreading sections. The plurality of antennas are provided at different physical positions to receive a first multiplexed signal, respectively. The plurality of spreading sections are provided for said plurality of antennas to spread said first multiplexed signal received by said plurality of antennas with spreading codes provided for said plurality of antennas to produce spread signals, respectively. The synthesizing section synthesizes said spread signals into an analog synthetic signal. The converting section converting said analog synthetic signal into a digital signal with a frequency such that a digital process can be applied to said digital signal. The plurality of first inverse spreading sections are provided for said plurality of antennas, to inversely spread said digital signal with first inverse spreading codes provided for said plurality of antennas to produce second multiplexed signals. The plurality of second inverse spreading sections provided for said plurality of antennas, to inversely spread said second multiplexed signals with second inverse spreading codes provided for said plurality of antennas to reproduce channel signals.

The first spreading codes and the first inverse spreading codes have the same pattern and same phase.

The first spreading code and the first inverse spreading code may be synchronous with the second spreading code and the second inverse spreading code, and may have correlation with the second spreading code and the second inverse spreading code such that no influence is given to the second spreading code and the second inverse spreading code. Otherwise, the first spreading codes and the first inverse spreading codes may have a spreading gain such that no influence is given to the second spreading code and the second inverse spreading code.

BRIEF DESCRIPTION OF THE DRAWINGS

FIG. 6 is a block diagram showing the structure of a radio apparatus according to a second embodiment of the present invention.

DESCRIPTION OF THE PREFERRED EMBODIMENTS

Next, a radio apparatus of the present invention will be described in detail below with reference to the attached drawings.

Figure 1:
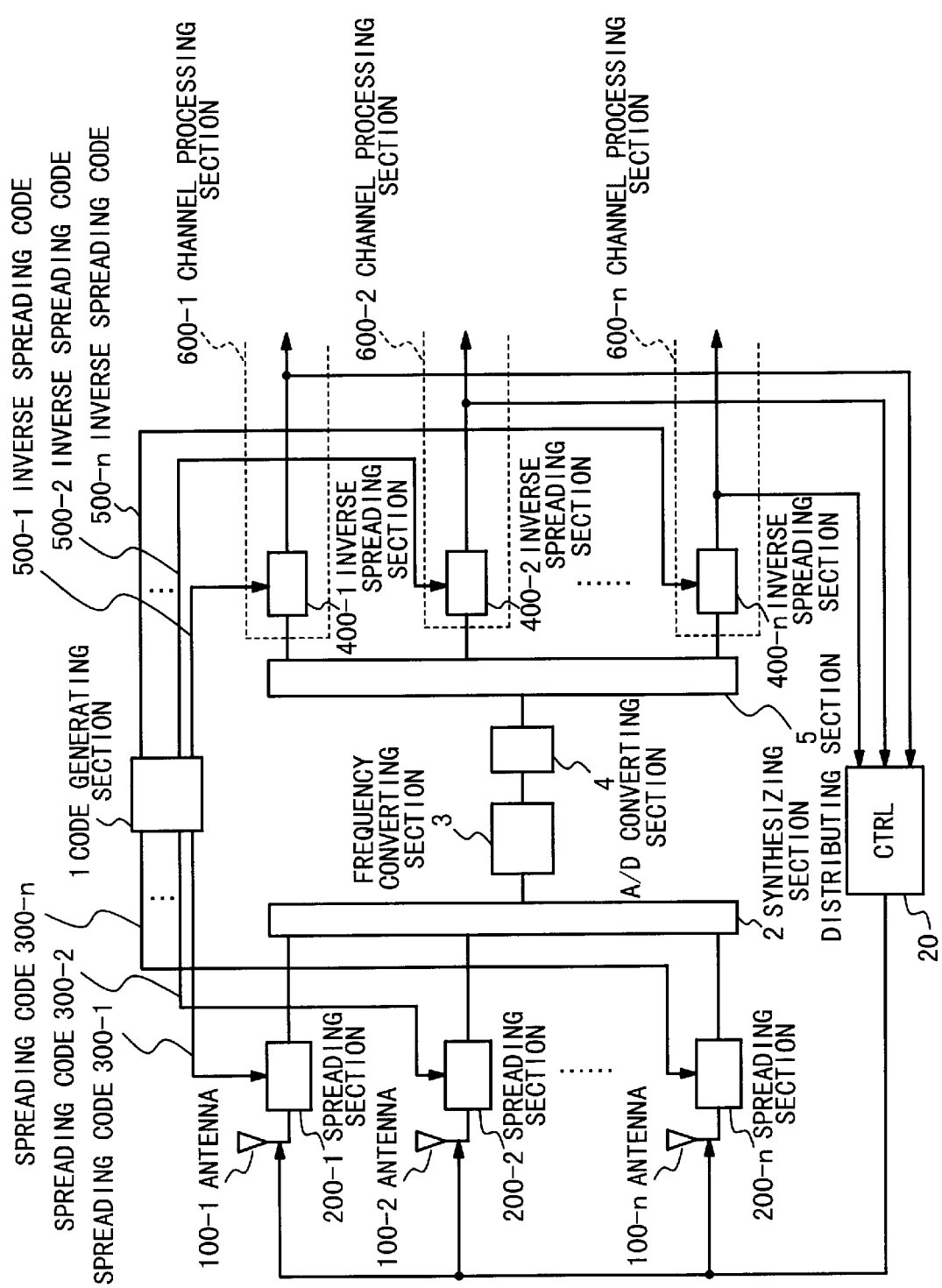
FIG. 1 is a block diagram showing the structure of a radio apparatus according to a first embodiment of the present invention.

FIG. 1 shows a block diagram showing the structure of the radio apparatus according to the first embodiment of the present invention. Referring to FIG. 1, the radio apparatus is composed of a plurality of antennas 100-1 to 100-n, spreading sections 200-1 to 200-n, a synthesizing section 2, a frequency converting section 3, an A/D (analog to digital) converting section 4, channel processing sections 600-1 to 600-n respectively including inverse spreading sections 400-1 to 400-n, a code generating section 1 and a control unit 20. The radio apparatus in the first embodiment detects the incident direction of radio wave from the phases of the radio wave received by the plurality of antennas 100-1 to 100-n to transmit a radio wave beam to the detected direction.

Referring to FIG. 1, a radio wave is radiated from a radio terminal and received by the plurality of antennas 100-1 to 100-n provided at different physical positions. In this case, the radio wave is received by each of the antennas 100-1 to 100-n to have a phase determined in accordance with an incident angle to an antenna input terminal. The code generating section 1 generates a plurality of spreading codes 300-1 to 300-n different from each other to supply to the spreading sections 200-1 to 200-n, respectively. The spreading sections 300-1 to 300-n modulate the received signals based on the spreading codes 300-1 to 300-n, respectively.

The synthesizing section 2 synthesizes the spread signals to produce an analog synthetic signal. The frequency converting section 3 converts in frequency the analog synthetic signal into a signal with a frequency to which it is possible to apply a digital process. Subsequently, the analog to digital (A/D) converting section 4 converts the frequency-converted signal into a digital signal. Subsequently, the digital signal is distributed to channel processing sections 600-1 to 600-n by the distributing section 5. The number of channel processing sections is equal to that of antennas. The inverse spreading sections 400-1 to 400-n of the channel processing sections 600-1 to 600-n carry out inverse spreading processes to the distributed signal based on inverse spreading codes 500-1 to 500-n, respectively. The inverse spreading codes 500-1 to 500-n are generated by the code generating section 1, and have the same pattern and phase as those of the spreading codes 300-1 to 300-n, respectively. Thus, only the digital signal can be reproduced from a carrier signal of the radio wave received by the antennas 100-1 to 100-n.

The control unit 20 receives the digital signals from the inverse spreading codes 500-1 to 500-n and controls the orientations of the antennas 100-1 to 100-n based on the digital signals.

Figure 3:
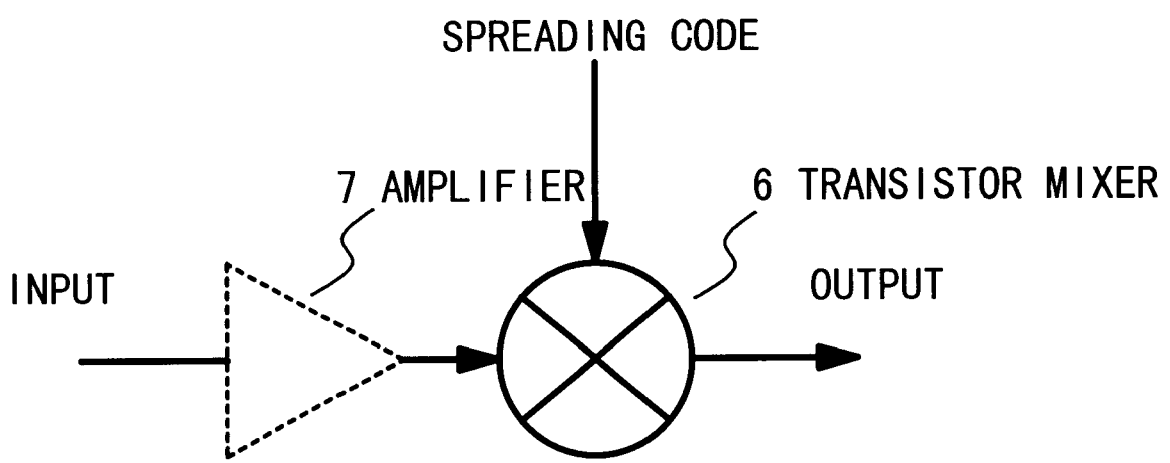
FIG. 3 is a block diagram showing the structure of a spreading section in the radio apparatus according to the embodiment of the present invention.

FIG. 3 is a diagram illustrating the structure of one of the spreading sections 200-1 to 200-n. Referring to FIG. 3, the spreading section is composed of a transistor mixer circuit 6 using HEMTs (High Electron Mobility Transistors) with a low NF. When a further lower NF is required, an amplifier 7 of low NF may be used in the front stage to the transistor mixer circuit 6. For example, a carrier signal $\sin(\omega t+\theta 1)$ supplied from the antenna 100-1 is spread by the spreading section 200-1 with the spreading code 300-1 which has been generated by the code generating section 1. Also, the signal $\sin(\omega t+\theta 2)$ supplied from the antenna 100-2 is spread by the spreading section 200-2 with the spreading code 300-2. In the same way, the signal $\sin(\omega t+\theta n)$ supplied from the antenna 100-n is spread by the spreading section 200-n with the spreading code 300-n. The spreading codes 300-1 to 300-n which have been generated by the code generating section 1 are necessary to be peculiar codes to the antennas 100-1 to 100-n, respectively. Moreover, it is desirable that the spreading codes have small correlation with each other. For example, an M series encoder is used as the code generating section 1.

Figure 4:
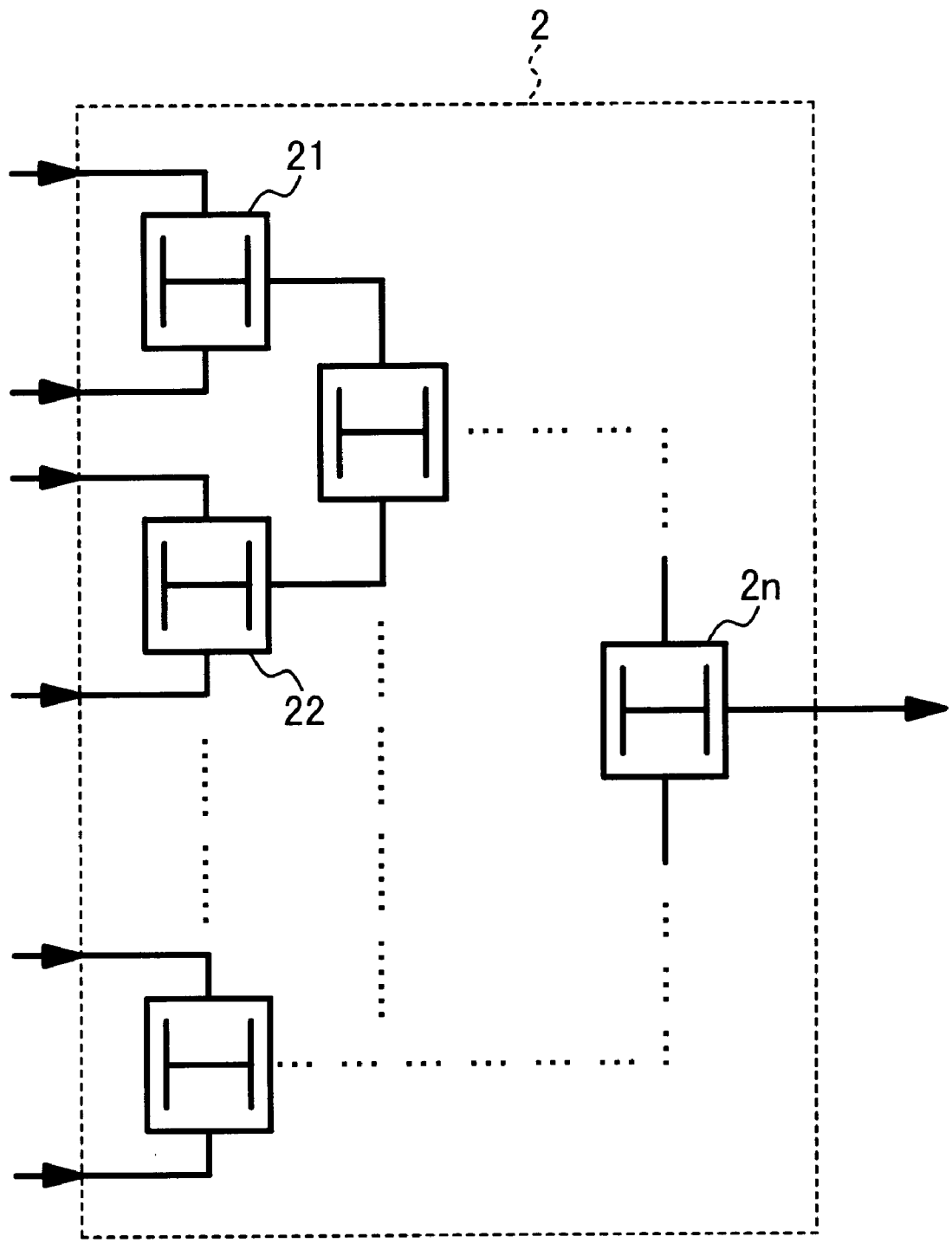
FIG. 4 is a block diagram showing the structure of a synthesizing section in the radio apparatus according to the embodiment of the present invention.

FIG. 4 is a diagram illustrating the structure of the synthesizing section 2. The synthesizing section 2 is composed of synthesizers 21, 22, . . . , 2n such as Wilkinson hybrid circuits connected in a tree shape form of multiple stages. The signals which have passed through the spreading sections 200-1 to 200-n are supplied to the hybrid circuits 21, 22, . . . , 2n of the synthesizing section 2, and are completely synthesized.

Figure 5:
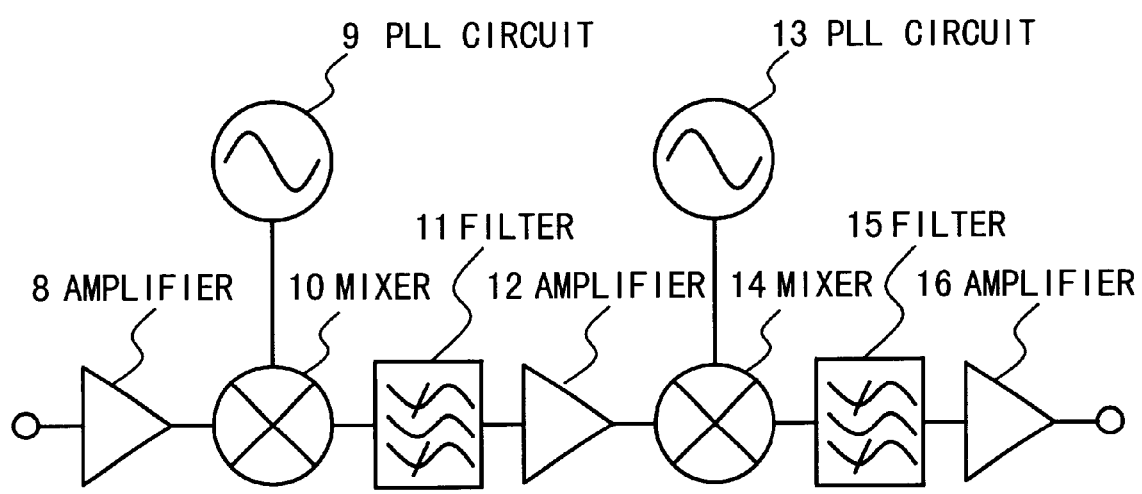
FIG. 5 is a block diagram showing the structure of a frequency converting section in the radio apparatus according to the embodiment of the present invention.

FIG. 5 is a diagram illustrating the structure of the frequency converting section 3. In this example, an example of a double superheterodyne system will be described. The frequency converting section 3 is composed of an amplifier 8, a PLL circuit 9, a mixer circuit 10, a filter 11, an amplifier 12, a PLL circuit 13, a mixer circuit 14, a filter 15 and an amplifier 16. The carrier signal which has passed through the synthesizing section 2 is amplified by the amplifier 8 of a low NF, and is converted in frequency by the mixer circuit 10 based on a local oscillation signal supplied from the PLL circuit 9. Moreover, an unnecessary radiation signal component generated by the mixer circuit 10 is removed from the frequency-converted signal by the filter 11. Then, after being amplified by the amplifier 12, the filtered signal is converted in frequency by the mixer circuit 14 based on a local oscillation signal supplied from the PLL circuit 13. As a result, the frequency of the filtered signal is decreased into a signal with the frequency to which it is possible to apply the digital processing. Moreover, an unnecessary radiation signal generated by the mixer circuit 14 is removed by the filter 15 and amplified by the amplifier 16.

Next, the carrier signal passing through the frequency converting section 3 is converted into the digital signal by the A/D converting section 4.

Next, the distributing section 5 distributes the digital signal outputted from the A/D converting section 4 into the inverse spreading sections 400-1 to 400-n of the channel processing sections 600-1 to 600-n. The number of antennas 100-1 to 100-n is equal to that of that channel processing sections 600-1 to 600-n. The distributing section 5 may be realized by bus lines because of the digital signal.

Next, an operation of the radio apparatus will be described below.

Figure 2:
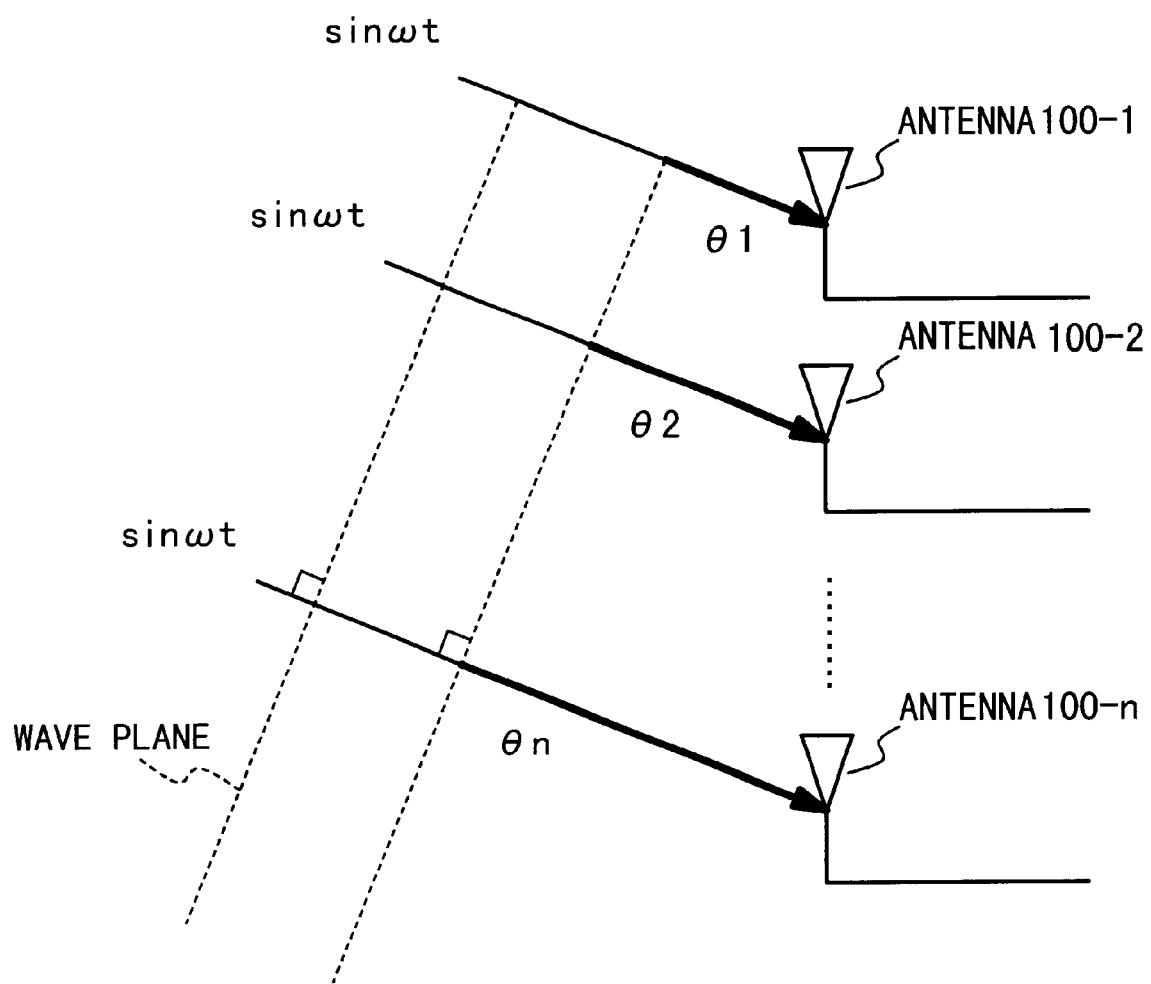
FIG. 2 is a diagram to explain a reception situation by antennas in the radio apparatus according to the first embodiment of the present invention.

It is supposed that a radio carrier signal $\sin\omega t$ is transmitted from a radio terminal apparatus and is received by a radio base station apparatus having a plurality of antennas 100-1 to 100-n provided at different physical positions. As-shown in FIG. 2, the carrier signal of the radio wave is received by the antennas 100-1 to 100-n with phase differences determined in accordance with the incident angles to the antennas 100-1 to 100-n. In this case, it is supposed that a multi-path fading such as Rayleigh fading is not generated. For example, when the radio wave is received by the antenna 100-1 of the radio base station apparatus, the carrier signal is received to have a phase-shift by the phase of $\theta 1$ from the carrier signal $\sin\omega t$. That is, a carrier signal $\sin(\omega t+\theta 1)$ is received. The carrier signal $\sin\omega t$ is phase-shifted by the phase of $\theta 2$ so that the carrier signal $\sin(\omega t+\theta 2)$ is received by the antenna 100-2. Similarly, the carrier signal $\sin\omega t$ is phase-shifted by the phase of On so that the carrier signal $\sin(\omega t+\theta n)$ is received by the antenna 100-n.

The carrier signal $\sin(\omega t+\theta 1)$ received by the antenna 100-1 is spread by the spreading section 200-1 with the spreading code 300-1 which has been generated by the code generating section 1. The different spreading codes are allocated to the respective antennas 100-1 to 100-n. Also, the carrier signal $\sin(\omega t+\theta 2)$ received by the antenna 100-2 is spread with a spreading code 300-2 by the spreading section 200-2. Similarly, the carrier signal $\sin(\omega t+\theta n)$ received by the antenna 100-n is spread with a spreading code 300-n by the spreading section 200-n.

Next, all the carrier signals spread by the spreading sections 200-1 to 200-n are synthesized by the synthesizing section 2 to produce the synthetic signal. Next, the synthetic signal supplied from the synthesizing section 2 is converted in frequency by the frequency converting section 3 into an analog signal with a frequency to which it is possible to apply a digital process.

Next, the analog signal supplied from the frequency converting section 3 is converted into a digital signal by the A/D converting section 4.

Next, the digital signal supplied from the A/D converting section 4 is distributed by the distributing section 5 into the inverse spreading sections 400-1 to 400-n of the channel processing sections 600-1 to 600-n. In the inverse spreading section 400-1, the digital signal is inversely spread with the inverse spreading code 500-1 of the same pattern and phase as those of the spreading code 300-1 which has been generated by the code generating section 1. Thus, only the digital signal can be reproduced which has been obtained by A/D-converting the carrier signal $\sin(\omega t+\theta 1)$ received by the antenna 100-1. Similarly, the digital signal supplied from the distributing section 5 is supplied to the inverse spreading section 400-n of the channel processing section 600-n. In the inverse spreading section 400-n, the digital signal is inversely spread with the inverse spreading code 500-n of the same pattern and phase as those of the spreading code 300-n which has been generated by the code generating section 1. Thus, only the digital signal is reproduced which is obtained by A/D-converting the carrier signal $\sin(\omega t+\theta n)$ received by the antenna 100-n.

Next, the control unit 20 controls or adjust the orientations of the antennas 100-1 to 100-n based on the inversely spread digital signals. Thus, the communication with the transmitting apparatus can be carried out with a good directionality.

It is supposed that the spreading code 300-n and the inverse spreading code 500-n are outputted at the same timing from the code generating section 1. In this case, a delay is caused to the inverse spreading codes until it actually reaches the inverse spreading section 400-n because of the filter of the frequency converting section 3. Therefore, the inverse spreading code in the inverse spreading section 400-n needs to be synchronized with the spreading code 300-n by any means such as a delay circuit.

The plurality of antennas 100-1 to 100-n form antennas of an adaptive array antenna system. In the adaptive array antenna system, the direction of the radio wave is detected based on the phases of the radio wave received by the plurality of antennas to produce a radio wave beam in the detect direction.

Next, the radio apparatus according to the second embodiment of the present invention will be described below.

FIG. 6 is a block diagram showing the structure of the radio apparatus according to the second embodiment. Referring to FIG. 6, the radio apparatus in the second embodiment is different from that in the first embodiment in that the control unit 20 is omitted. Instead, inverse spreading sections 700-1 to 700-n are respectively added to the channel processing sections 600-1 to 600-n, and a code generating section 22 is added to generate inverse spreading codes for the inverse spreading sections 700-1 to 700-n.

The inverse spreading sections 700-1 to 700-n inversely spread the output signals from the inverse spread sections 400-1 to 400-n with inverse spreading codes from the code generating section 22.

Generally, in the CDMA system, signals are spread or multiplexed with spreading codes peculiar to channels on the transmitter side. In the receiver side, the multiplexed signal is received by the antennas 100-1 to 100-n and spread by the spreading sections 200-1 to 200-n, as in the first embodiment. Then, the spread multiplexed signals are synthesized and frequency-converted to produce a digital multiplexed signal. The digital multiplexed signal is distributed into the inverse spreading sections 400-1 to 400-n and subjected to the inverse spreading processes using the inverse spreading codes 500-1 to 500-n. Thus, the digital multiplexed signals are obtained. The spreading code and the corresponding inverse spreading code have the same pattern and the same phase.

The multiplexed signals are inversely spread or demodulated by the inverse spreading sections 700-1 to 700-n using the inverse spreading codes which have been generated by the code generating section 22. Thus, communication signals for channels can be obtained. In this case, the inverse spreading codes from the code generating section 22 are associated with the spreading codes on the transmission side.

In the above, the desired channel signal may be obtained by providing correlation circuits together with the inverse spreading sections 400-n without using the distributing section 5.

It is supposed that a reception radio wave in this embodiment is a radio wave of the CDMA system. In this case, the spreading section and the inverse spreading section used in this embodiment are provided between a spreading stage and an inverse spreading stage of the CDMA system. Therefore, it is necessary that the spreading code 300-n and the inverse spreading code 500-n have no influence to the spreading code and inverse spreading code in the CDMA system in this embodiment. That is, if the spreading code and the inverse spreading code in this embodiment are processed at the same rate as the spreading code and the inverse spreading code in the CDMA system and both are asynchronous, the spreading code in the CDMA system is destroyed. Therefore, it is preferable that the spreading code and the inverse spreading code in this embodiment are synchronized with the spreading code and the inverse spreading code in the CDMA system and have less correlation with the spreading code and the inverse spreading code in the CDMA system. Otherwise, it is preferable that the spreading code and the inverse spreading code in this embodiment have sufficiently higher spreading gain than that of the spreading code and the inverse spreading code in the CDMA system.

The present invention is not limited to the adaptive array antenna system of the above mentioned first embodiment. The present invention can be applied to a radio apparatus which has a plurality of antennas and which has the necessity to distinguish whether a signal is supplied from any of the antennas.

Also, the antenna can be oriented to the direction of the reception radio wave based on phase differences between the respective antennas. Thus, it is possible to effectively apply the present invention to the optimal reception system, i.e., to the adaptive array antenna system.

As described above, according to the present invention, a peculiar spreading code is allocated to one antenna. Accordingly, one of the antennas, i.e., the incident direction of the carrier signal can be determined, even if the frequency converting section 3 and the A/D converting section 4 are commonly used. Therefore, if the reception signal supplied from the antenna is considered in relation to the spectrum spreading signal transmitting and receiving system, a circuit portion, which has been providing every conventional antenna, from the frequency converting section 3 to the A/D converting section 4 can be used in common to the antennas. Therefore, the radio apparatus can be simplified.

Also, because the oscillating source which is necessary for the frequency conversion can be used commonly, the radio apparatus can be further simplified. In addition, the demodulation phase can be kept constant from the antenna input terminal to the digital signal. Therefore, the phases of the reception signals received by the respective antennas can be kept so that the phase differences can be detected without any error of the phase differences. Thus, the adaptive array antenna system can be stably operated.

What is claimed is:

1. A radio apparatus comprising:
   a plurality of antennas provided at different physical positions to receive a radio wave signal, respectively;
   a plurality of spreading sections provided for said plurality of antennas to spread said radio wave signal received by said plurality of antennas with spreading codes provided for said plurality of antennas to produce spread signals, respectively;
   a synthesizing section synthesizing said spread signals into an analog synthetic signal;
   a converting section converting said analog synthetic signal into a digital signal with a frequency such that a digital process can be applied to said digital signal;

a plurality of inverse spreading sections provided for said plurality of antennas, to inversely spread said digital signal with inverse spreading codes provided for said plurality of antennas to produce inversely spread signals; and a control unit controlling orientation of said plurality of antennas based on said inversely spread signals.

2. A radio apparatus according to claim 1, further comprising a code generating section generating said spreading codes and said inverse spreading codes.

3. A radio apparatus according to claim 1, wherein one of said spreading codes and a corresponding one of said inverse spreading codes have the same pattern and same phase.

4. A radio apparatus according to claim 3, wherein said spreading codes are peculiar to said plurality of antennas.

5. A radio apparatus according to claim 1, wherein said radio wave signal is of a TDMA system using a specific spreading code and a specific inverse spreading code, and wherein said spreading codes and said inverse spreading codes are synchronous with said specific spreading code and said specific inverse spreading code, and have correlation with said specific spreading code and said specific inverse spreading code such that no influence is given to said specific spreading code and said specific inverse spreading code.

6. A radio apparatus according to claim 1, wherein said radio wave signal is of a TDMA system using a specific spreading code and a specific inverse spreading code, and wherein said spreading codes and said inverse spreading codes have a spreading gain such that no influence is given to said specific spreading code and said specific inverse spreading code.

7. A radio apparatus according to claim 1, wherein said plurality of antennas receive said radio wave signal to have phase shifts determined based on the physical positions.

8. A method of reproducing a digital signal in a radio apparatus, comprising:

receiving a carrier signal of a radio wave by a plurality of antennas provided at different physical positions;

spreading the received carrier signals with spreading codes provided for said plurality of antennas;

synthesizing said spread signals into an analog synthetic signal;

converting said analog synthetic signal into a converted signal with a frequency such that a digital process can be applied to said digital signal; and inversely spreading said converted signal with inverse spreading codes provided for said plurality of antennas so that digital signals can be reproduced.

9. A method according to claim 8, further comprising generating said spreading codes and said inverse spreading codes.

10. A method according to claim 8, wherein one of said spreading codes and a corresponding one of said inverse spreading codes have the same pattern and same phase.

11. A method according to claim 10, wherein said spreading codes are peculiar to said plurality of antennas.

12. A method according to claim 8, wherein said carrier signal is of a TDMA system using a specific spreading code and a specific inverse spreading code, and wherein said spreading codes and said inverse spreading codes are synchronous with said specific spreading code and said specific inverse spreading code, and have correlation with said specific spreading code and said specific inverse spreading code such that no influence is given to said specific spreading code and said specific inverse spreading code.

13. A method according to claim 8, wherein said carrier signal is of a TDMA system using a specific spreading code and a specific inverse spreading code, and wherein said spreading codes and said inverse spreading codes have a spreading gain such that no influence is given to said specific spreading code and said specific inverse spreading code.

14. A method according to claim 8, wherein said receiving includes:

receiving said carrier signal by said plurality of antennas to have phase shifts determined based on the physical positions.

15. A radio apparatus comprising:

a plurality of antennas provided at different physical positions to receive a first multiplexed signal, respectively;

a plurality of spreading sections provided for said plurality of antennas to spread said first multiplexed signal received by said plurality of antennas with spreading codes provided for said plurality of antennas to produce spread signals, respectively;

a synthesizing section synthesizing said spread signals into an analog synthetic signal;

a converting section converting said analog synthetic signal into a digital signal with a frequency such that a digital process can be applied to said digital signal;

a plurality of first inverse spreading sections provided for said plurality of antennas, to inversely spread said digital signal with first inverse spreading codes provided for said plurality of antennas to produce second multiplexed signals; and a plurality of second inverse spreading sections provided for said plurality of antennas, to inversely spread said second multiplexed signals with second inverse spreading codes provided for said plurality of antennas to reproduce channel signals.

16. A radio apparatus according to claim 15, wherein said first spreading codes and said first inverse spreading codes have the same pattern and same phase.

17. A radio apparatus according to claim 15, wherein said first spreading code and said first inverse spreading code are synchronous with said second spreading code and said second inverse spreading code, and have correlation with said second spreading code and said second inverse spreading code such that no influence is given to said second spreading code and said second inverse spreading code.

18. A radio apparatus according to claim 15, wherein said first spreading codes and said first inverse spreading codes have a spreading gain such that no influence is given to said second spreading code and said second inverse spreading code.

* * * * *